United States Patent [19]

Wilhelmson et al.

[11] Patent Number: 4,673,300
[45] Date of Patent: Jun. 16, 1987

[54] CALIBRATED PROBE FOR TEMPERATURE MEASURING

[75] Inventors: Jack L. Wilhelmson; Lester B. Postlewait, both of Cheraw, S.C.

[73] Assignee: Cooper Industries, Inc., Houston, Tex.

[21] Appl. No.: 790,659

[22] Filed: Oct. 24, 1985

Related U.S. Application Data

[63] Continuation of Ser. No. 670,126, Nov. 9, 1984, abandoned, which is a continuation of Ser. No. 379,857, May 19, 1982, abandoned.

[51] Int. Cl.⁴ .............................................. G01L 7/10
[52] U.S. Cl. .................................. 374/182; 136/222; 374/164; 374/181
[58] Field of Search ...................... 374/181, 182, 164; 219/497, 498, 494; 136/222

[56] References Cited

U.S. PATENT DOCUMENTS

| | | |
|---|---|---|
| Re. 30735 | 9/1981 | Inlenfeldt et al. |
| 2,138,593 | 11/1938 | Breitenstein ........................ 374/181 |
| 2,696,120 | 12/1954 | Underwood ........................ 374/182 |
| 3,321,974 | 5/1967 | Sterbutzel . |
| 3,503,260 | 3/1970 | Polsky ................................ 374/181 |
| 3,534,809 | 10/1970 | Charitat ............................. 374/182 |
| 3,646,577 | 2/1972 | Ernst . |
| 3,688,580 | 9/1972 | Jarzembski . |
| 3,834,237 | 9/1974 | Robertson . |
| 3,853,000 | 12/1974 | Barnett et al. . |
| 4,084,437 | 4/1978 | Finnegan . |
| 4,120,210 | 10/1978 | Wargo . |
| 4,133,700 | 1/1979 | Hollander . |

FOREIGN PATENT DOCUMENTS

| | | |
|---|---|---|
| 2217964 | 10/1973 | Fed. Rep. of Germany . |
| 2044179 | 2/1971 | France . |
| 2305720 | 10/1976 | France . |
| 52-21883 | 2/1977 | Japan . |

Primary Examiner—Charles Frankfort
Assistant Examiner—Thomas B. Will
Attorney, Agent, or Firm—Finnegan, Henderson, Farabow, Garrett & Dunner

[57] ABSTRACT

A temperature probe using a first thermocouple junction at the end of a metal tip for measuring the temperature of an object is also provided with a second thermocouple junction on the metal tip at a predetermined distance from the first thermocouple for detecting heat flow in the tip from the first thermocouple toward the second thermocouple. Electronics responsive to both themocouples drive a heater which maintains the second thermocouple at substantially the same temperature as the first thermocouple, thereby to eliminate heat loading by the probe on the object being measured. A single adjustable resistance temperature detector electronically connected in series with the metal tip is used to calibrate the probe and compensate for errors in the temperature readings of the first and second thermocouples. The resistance temperature detector is made up of a wire located in the handle of the probe and is adjusted by stretching the wire to reduce its diameter and bulk resistance.

8 Claims, 5 Drawing Figures

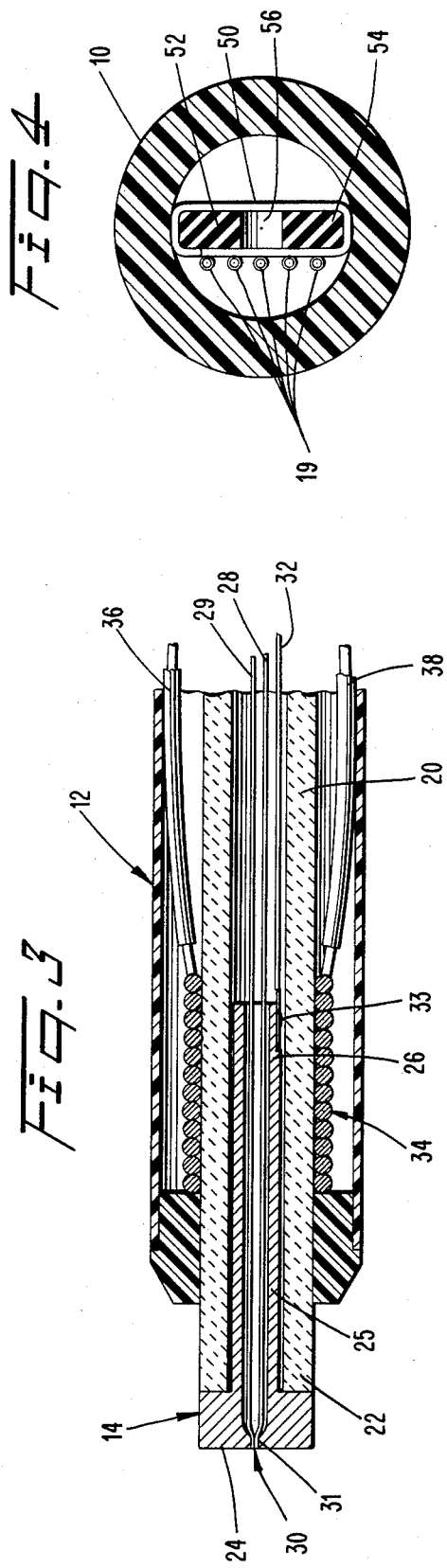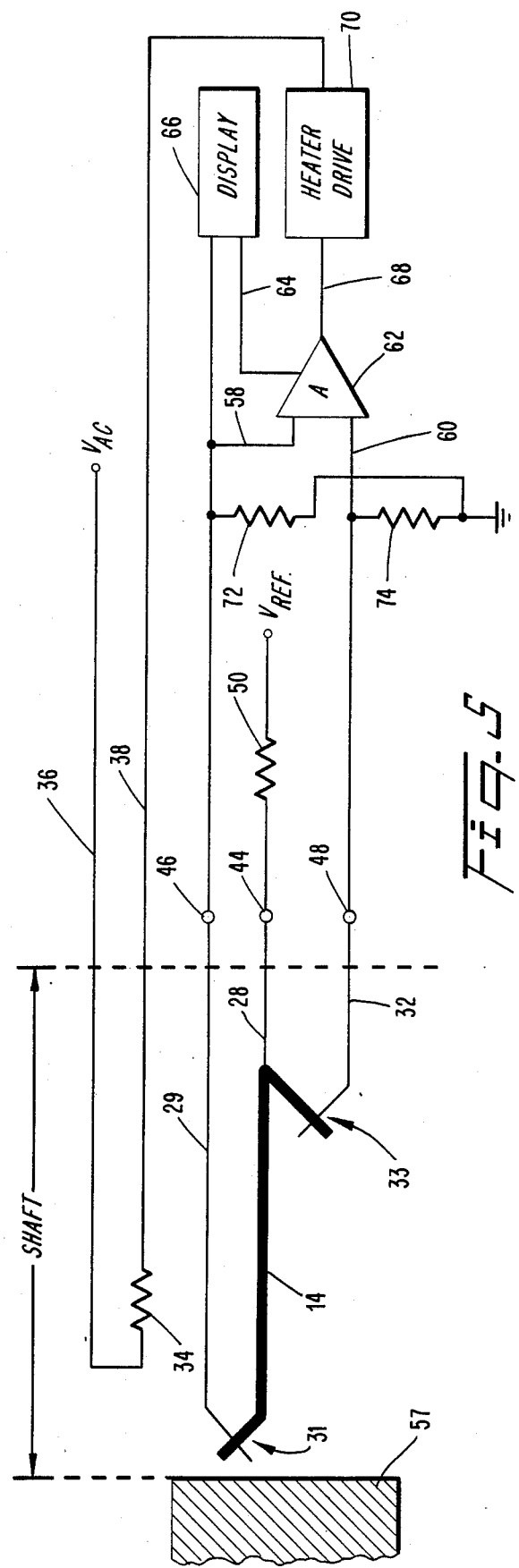

CALIBRATED PROBE FOR TEMPERATURE MEASURING

This application is a continuation, of application Ser. No. 06/670,126, filed Nov. 9, 1984 now abandoned, which is a continuation, of application Ser. No. 06/379,857, filed May 19, 1982, now abandoned.

BACKGROUND OF THE INVENTION

1. Field of the Invention

This invention relates to the field of hand-held probes for measuring the temperature of objects with which such probes are brought into contact.

2. Background Art

The assembly of delicate components and fine wiring used in modern miniaturized electronics requires soldering equipment which can operate within precise, narrow temperature limits. The need to verify that such equipment complies with its desired operational temperature ranges has spurred a search for temperature measuring devices which have an accuracy of +1° C. in the range of 40° C. to 500° C. In hand-held probes, however, which normally use thermocouples for temperature measurement, several problems arise.

First, structural characteristics and inherent metallurgical impurities afflict any given thermocouple with a built-in measurement error margin which is a relatively constant quantity irrespective of changes in either the ambient or the measured temperatures. Thus the basic accuracy of a thermocouple between 100° C. and 500° C. is no better than +11° C. This problem has been met to some extent by careful manufacture and selection of the wires that make up each thermocouple and by the use of calibration circuits which can be set to compensate electrically for the error margin built into the thermocouple with which the calibration circuit is operated.

In addition, however, the metals used in thermocouples are usually different from those used in the electronic circuitry of the instrumentation which processes the thermocouple temperature readings. For example, a common thermocouple, the Type J thermocouple, is made up of a junction between an iron and a constantan lead, while electronic circuits commonly have conductors made of copper. This means that where the output leads of the thermocouple are connected to an electronic circuit, a bimetallic junction will result. Such a junction itself tends to function in the manner of a thermocouple, adding or subtracting to the instrumentation system voltages which vary in amount as the temperature at those junctions changes.

This second source of thermocouple error is commonly dealt with in one of two ways. The output connections can be held at a constant temperature, as in an ice bath or in an oven of known temperature, converting the connections into reference junctions which produce an invariant thermoelectric effect that can be counteracted by additional circuitry. An ice bath or a constant temperature oven is too bulky to permit locating the reference junctions in the hand-held portion of a thermocouple probe. Yet the metals of which thermocouple output leads are commonly composed are too brittle to permit the leads to be extended long distances from the thermocouples before junctioning with the copper of an electronic circuit, as for example to the stationary console unit from which such probes are operated and in which units sufficient space does exist to place an ice bath or constant temperature oven.

In the alternative, yet another calibration element, one having a compensating electrical effect which varies with the temperature of the output junctions, is added to the circuitry. Careful design and selection of such a calibration element ideally permit its temperature dependent electrical effects to offset the variable errors in thermocouple readings caused in the output junctions by ambient temperature changes.

Measuring instruments which use thermocouples in hand-held probes generally require that the probes be interchangeable so that the combination of a new probe with the same instrumentation console need not be re-calibrated when an old probe is replaced. This requirement further complicates calibration solutions to thermocouple errors, both those errors built in and those arising from the unwanted effects of output junctions. The problems in this regard are so numerous that only prohibitively expensive instruments using selected probes can meet the normal accuracy requirement range of +1° C. over a normal range of ambient temperatures and a range of 100° C. to 500° C. in measured temperatures.

A third difficulty encountered with the accuracy of handheld thermocouple probes is that in measuring small items having high temperatures, the probe itself serves as a heat sink, drawing heat into itself and out of the measured item. This probeloading effect reduces the temperature of the measured item in the vicinity of the probe, resulting in a correspondingly inaccurate lower than actual temperature reading. A partial solution to this difficulty is found in making probe tips very fine, but such delicate equipment does not withstand everyday or repeated use.

SUMMARY OF THE INVENTION

Accordingly, one object of the present invention is to produce a hand-held probe that measures temperatures from 40° C. to 500° C. with an accuracy of +1° C.

Another object of the invention is to produce a temperature probe which creates no loading effect on the item being measured but which is sufficiently rugged to sustain repeated everyday use.

Yet another object of the invention is to create a hand-held probe which is interchangeable in relation to its instrumentation and controls without requiring re-calibration of the probe-instrumentation combination.

Finally, it is an object of the present invention to create an accurate, interchangeable hand-held temperature probe having no loading effect which is easily and inexpensively manufactured.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a calibrated probe for measuring the temperature of an object with which said probe is contacted is provided in one embodiment of the present invention with a metal tip composed of a first metal and having thereon a first location at which the tip is in contact with the object and a second location at a predetermined distance from the first location; and means for preventing heat flow in the metal tip from the first location toward the second location. Preferably, the means for preventing heat flow in the metal tip comprises a first means for measuring temperature at the first location on the metal tip, a second means for measuring the temperature at the second location on the metal tip, a heater at least a portion of which is intermediate the first and second locations on the metal tip, and a differential amplifier having first and second inputs responsive respectively to the first and second temperature measuring means and an output for driving the heater when the temperature at the first location on the metal tip exceeds the temperature at the second location thereon.

The first temperature measuring means preferably is a first thermocouple which comprises a first lead composed of the first metal and having first and second ends, with the first end connected to the first location on the metal tip, and a second lead composed of a second metal and having first and second ends, with the first end thereof connected to the first end of the first lead and the second end thereof terminating in a first output junction connected to the first input of the differential amplifier. The second temperature measuring means is a second thermocouple comprising a third lead composed of the second metal and having first and second ends, with the first end thereof connected to the second location on the metal tip and the second end thereof terminating in a second output junction connected to the second input of the differential amplifier. Preferably, the first metal is iron and the second metal is constantan.

In another aspect of the present invention, a calibrated probe as described above is further provided with calibrating means for compensating for errors in the temperature readings of the first and second thermocouples. The calibrating means comprises a single resistance temperature detector in close proximity to the first and second output junctions, the calibrating means being connected in series with the second end of the first lead. Preferably the resistance temperature detector comprises a wire and means for reducing the diameter of the wire by stretching.

BRIEF DESCRIPTION OF THE DRAWINGS

The invention will be described with additional specificity and detail through the use of the accompanying drawings in which:

FIG. 3 is an enlarged cross section of the tip portion of the hand-held probe of FIG. 1;

FIG. 4 is a transverse cross section of the hand-held probe shown in FIG. 2 taken along the section line 4—4 of FIG. 2; and FIG. 5 is a simplified electrical schematic diagram of a hand-held temperature probe incorporating the teachings of the present invention along with its associated instrumentation circuitry.

DESCRIPTION OF THE PREFERRED EMBODIMENT

Figure 1:
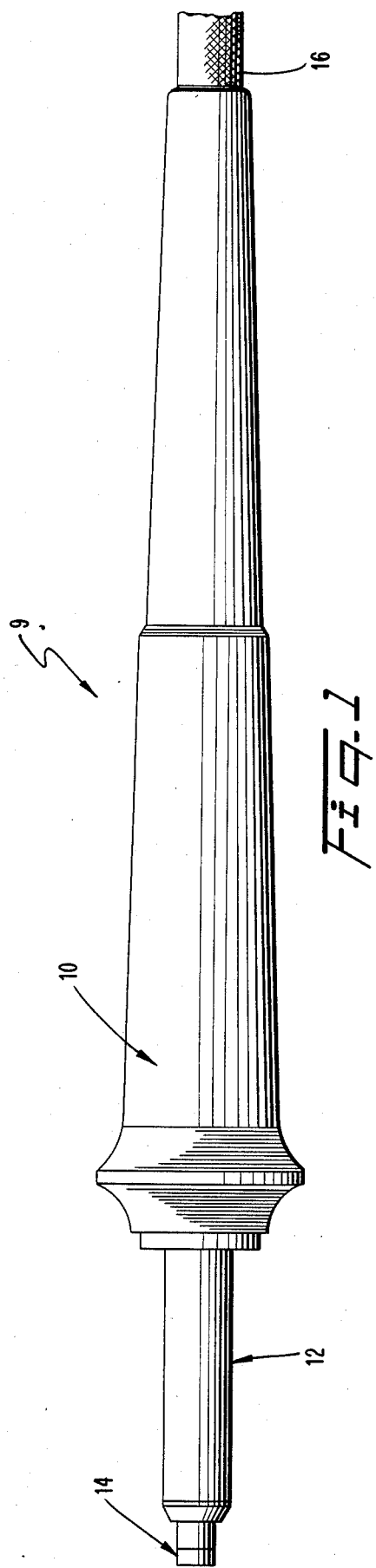
FIG. 1 is an exterior elevation view of the hand-held portion of a temperature probe incorporating the teachings of the present invention.

Referring to FIG. 1, the exterior of a hand-held temperature probe 9 for measuring the temperature of an object is shown comprising a handle portion 10 and an elongated shaft portion 12 terminating in a metal tip 14 which actually contacts the object the temperature of which is to be measured. The probe is electrically connected by a cable 16 to a console (not shown) containing the electronics which amplify and drive probe 9 and display its temperature readings.

Figure 2:
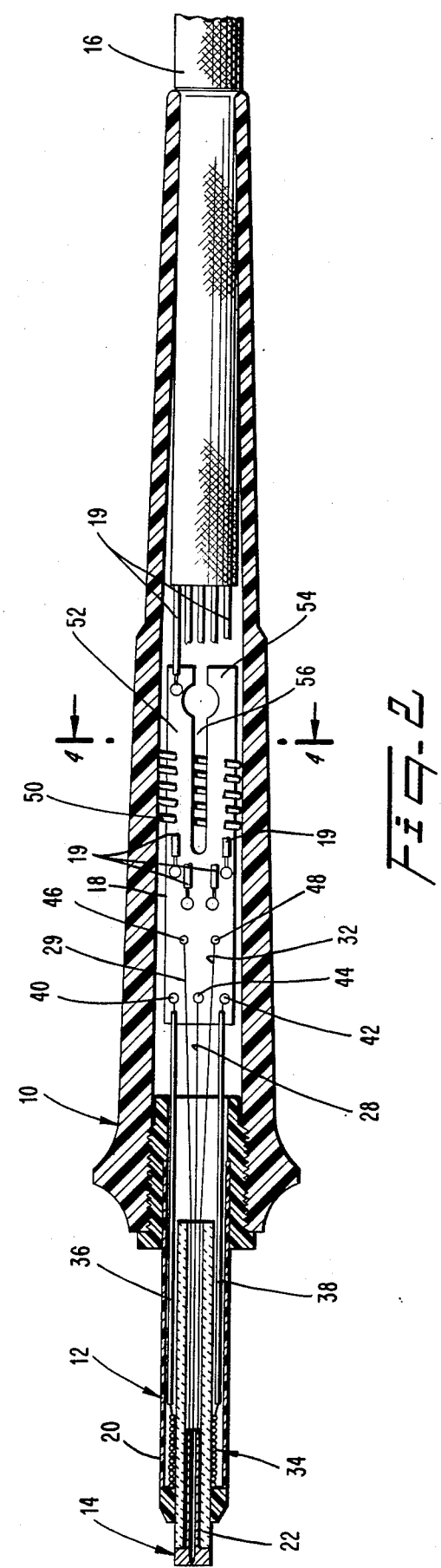
FIG. 2 is a longitudinal sectional view of the hand-held portion of the temperature probe shown in FIG. 1.

The cross section of probe 9 shown in FIG. 2, discloses that within handle portion 10 is a printed wiring board 18 to which are connected numerous wires 19 leading to cable 16. Disposed within elongated shaft portion 12 is a ceramic tube 20 housing in one end 22 thereof metal tip 14. As more advantageously shown in FIG. 3, on a portion of metal tip 14 which extends beyond end 22 of ceramic tube 20 is a first location 24 at which the temperature probe contacts the object the temperature of which is to be measured. Furthermore, metal tip 14 has a shank 25 extending inside ceramic tube 20. On shank 25 is a second location 26 at a predetermined distance from first location 24.

The predetermined distance between first location 24 and second location 26 can vary depending on the conditions under which the probe is to be used. For the temperature measurement range contemplated, the distance between first location 24 and second location 26 must first be large enough to permit a temperature gradient to arise between first location 24 and second location 26 when temperature measurement is in progress. On the other hand, the predetermined distance must be small enough to permit such a degree of thermal coupling between second location 26 and first location 24 that the addition of heat to metal tip 14 in the vicinity of second location 26 will reduce in a prompt fashion the rate of heat flow out of the item being measured and into metal tip 14 at first location 24. It has been found that for purposes of the present invention a predetermined distance of about 0.5 to 1.0 inches is preferable.

In accordance with one aspect of the present invention, means are provided for preventing heat flow in metal tip 14 from first location 24 to second location 26 when temperature measurements are being taken with probe 9. As embodied herein the means for preventing heat flow includes a first means for measuring the temperature at location 24, a second means for measuring the temperature at location 26, and heater means for maintaining location 26 at substantially the same temperature as location 24.

The first means for measuring the temperature at location 24 includes a first lead 28 composed of a first metal identical to that of tip 14 and a second lead 29 composed of a second metal different from that of metal tip 14 both crimped within a small hole 30 in metal tip 14 at first location 24. Second lead 29 and metal tip 14 form a first thermocouple junction 31 which is exposed at first location 24 to contact with any object the temperature of which is being measured and is used to sense the actual temperature of that object. It should be noted that although first lead 28 is depicted for purposes of illustration in FIGS. 2 and 3 as joined to metal tip 14 at the same point as is second lead 29, first lead 28, which is composed of the same metal as metal tip 14, could be connected anywhere on metal tip 14 without impairing the operation of probe 9.

The second means for measuring the temperature at location 26 includes a third lead 32 composed of a metal like that of lead 29. Lead 32 is welded at second location 26 on shank 25 of metal tip 14 to create a second thermocouple junction 33 which senses the temperature of metal tip 14 at second location 26. Heat flow from first location 24 toward second location 26 can be detected from the difference in temperatures at first location 24 and second location 26. If the difference is positive, heat is flowing away from location 24 and the object being measured, and tip 14 is "loading" heat from the item being measured.

In practice the heater means for maintaining location 26 at substantially the same temperature as location 24 includes a heating element 34 wound around the outside of ceramic tube 20 and having leads 36, 38. At least a portion of heating element 34 lies intermediate second location 26 on metal tip 14 and end 22 of ceramic tube 20. Heating element 34 is controlled by electronic circuitry which uses the difference in potential between thermocouples 31, 33 as a driving signal for activating heater element 34. Therefore, by electronic feedback the heat flow in metal tip 14 from first location 24 to second location 26 is forced to be very close to zero at all times. This eliminates the heat "loading" effect of probe 9 on the temperature of the item being measured.

Reduction of the heat "loading" effect to close to zero permits the construction of a probe having a more substantial and rugged tip, because elimination of heat "loading" is achieved not through the fineness of the probe tip, but through the feedback circuitry and differential temperature sensing capacity provided by thermocouple 31 at first location 24 and thermocouple 33 at second location 26 a predetermined distance away. Therefore the tip 14 of temperature probe 9 can be constructed rugged enough to withstand everyday repeated usage.

Although metal tip 14 and thermocouple leads 28, 29, 32 can be made of a number of metals, tip 14 is advantageously composed of iron with lead 28 being made of that same metal. Leads 29, 32 are preferably constantan; so that thermocouple junctions 31, 32 being iron/constantan junctions are Type J thermocouples. As can best be seen in FIG. 2, constantan leads 29, 32 respectively join the copper circuitry of probe 9 at contacts 46, 48 located on printed wiring board 18. These junctions between constantan and copper respectively constitute unwanted first and second reference junctions which contribute temperature variable thermoelectric effects to the probe electronics. Iron lead 28 forms a similarly unwanted output junction at its union with contact 44 on printed wiring board 18. Heater leads 36, 38 are joined respectively to printed wiring board 18 at contacts 40, 42 which do not constitute such unwanted junctions.

In another aspect of the present invention, a calibrated temperature probe having a first thermocouple for measuring the temperature of an object with which said probe is contacted and having a second thermocouple for detecting heat loading by the probe, uses a calibrating means to compensate for errors in the temperature measurements of the first and second thermocouples. The calibrating means includes a resistance temperature detector 50 in close proximity to both first output junction 46 and second output junction 48 and connected in series with iron lead 28. Resistance temperature detector 50 comprises a wire and means for reducing the diameter of the wire by stretching. Referring to FIGS. 2 and 4 together, printed wiring board 18 has a pair of generally parallel legs 52, 54 with a space 56 therebetween. The means for reducing the diameter of the wire of resistance temperature detector 50 by stretching includes a winding of the wire of resistance temperature detector 50 about legs 52, 54 in such a manner that when space 56 between legs 52 and 54 is widened, the wire is stretched longitudinally reducing its diameter.

The temperature coefficient of resistance temperature detector 50 is selected such that its proximity to output junctions 44, 46, 48 permits resistance temperature detector 50 to compensate for the effects of ambient handle temperature changes on junctions 44, 46, 48. In practice the bulk resistance of resistant temperature detector 50 is calculated to compensate for impurities and the bulk resistance of thermocouples 31, 33, thereby to overcome the +11° C. error present in most thermocouple measuring devices. In the assembly of the probe, each resistance temperature detector 50 is finely adjusted by the technique of thermally coupling the newly assembled probe with a standard temperature probe and using an appropriate tool to widen space 56, stretching the wire of resistance temperature detector 50, reducing its diameter and changing its bulk resistance without altering its temperature coefficient. When the temperature difference between the new probe and the standard probe is zero, resistance temperature detector 50 and thermocouples 31, 33 are permanently calibrated to each other.

The operation of temperature probe 9 is further illuminated by reference to the schematic diagram contained in FIG. 5, in which thermocouple 31 is shown contacting object 57 to measure the temperature thereof. Thermocouple 33 senses heat flow in metal tip 14. Resistance temperature detector 50 is connected in series between a reference voltage $V_{ref}$ and one end of iron lead 28 which is electrically common to both thermocouples 31, 33. The temperatures sensed by thermocouples 31, 33 are conveyed respectively by way of constantan leads 29, 32 and output junctions 46, 48 to first and second inputs 58, 60 of amplifier 62. Output 64 of amplifier 62 drives a display unit 66 which shows the temperature measured by thermocouple 31, while output 68 of amplifier 62 stimulates heater drive 70 to turn on heating element 34 when the temperature sensed by thermocouple 31 is greater than that sensed by thermocouple 33. Heater 34 is connected in series between heater drive 70 and a voltage source $V_{ac}$ by leads 38, 36, respectively. Output junctions 46, 48 are grounded respectively through first and second completion resistors 72, 74 which afford a path for the current which passes through resistance temperature detector 50.

It should be noted that it is the fact that resistance temperature detector 50 is in effect in series with each of thermocouples 31, 33 that permits more than one thermocouple to be calibrated by using just one resistance temperature detector. The two constantan leads 29, 32 used in any individual probe are always made of the same piece of thermocouple wire and therefore match very well in both bulk resistance and temperature coefficient. For these reasons, a single resistance temperature detector, such as resistance temperature detector 50, can correctly compensate for two thermocouples at once. This makes calibration of the device a relatively simple and inexpensive procedure when compared with those used previously.

It will be apparent to those skilled in the art that modifications and variations can be made in the apparatus of this invention. The invention in its broader aspects is, therefore, not limited to the specific details, representative methods and apparatus and illustrative examples shown and described. Accordingly, alterations may be made from such details without departing from the spirit or scope of applicants' general inventive concept.

What is claimed is:

1. A calibrated probe for measuring the temperature of an object with which said probe is contacted, comprising:
    (a) a thermocouple in contact with said object for measuring the temperature of said object and having first and second leads;
    (b) electronic circuitry for amplifying and displaying the temperature reading at said thermocouple, said circuitry being connected to said first lead of said thermocouple to define an output junction thereat; and
    (c) a resistance temperature detector in close proximity to said output junction, said resistance temperature detector connected in series with said second lead of said thermocouple and comprising:
        i. a wire;
        ii. a frame having a pair of generally parallel legs with a space therebetween, said legs being adapted for movement relative each other, and
        iii. a winding of said wire about said pair of legs, said wire being stretched longitudinally when said space between said pair of legs is widened to accomplish calibration of said thermocouple.

2. A calibrated probe, as recited in claim 1, wherein said first thermocouple lead is composed of constantan and said second thermocouple lead is composed of iron.

3. In a calibrated temperature probe for measuring the temperature of an object without thermally loading the object or erroneously reducing the temperature being measured, said probe having a first thermocouple at a first location in contact with said object, the improvement comprising:
    (a) an iron tip having situated thereon said first location and a second location at a predetermined distance therefrom, said first and second locations being in thermal communication via said tip;
    (b) a first constantan lead having first and second ends with said first end connected to said first location on said iron tip and said second end terminating in a first output junction;
    (c) a second constantan lead having first and second ends, with said first end thereof connected to said second location on said iron tip and said second end thereof terminating in a second output junction;
    (d) a single iron lead having first and second ends with said first end thereof connected to said iron tip;
    (e) calibrating means for compensating for errors in temperature measurements at said first and second locations, said calibrating means comprising a single resistance temperature detector in close proximity to said first and second output junctions, said resistance temperature detector including a wire connected in series with said second end of said single iron lead and means for reducing the diameter of said wire by stretching; and
    (f) heater means responsive to the temperature measurements at said first and second locations for preventing heat flow in said iron tip from said first location toward said second location by maintaining said second location at substantially the same temperature as the temperature at said first location, said heat flow characterizing the unwanted loading.

4. A calibrated probe for measuring the temperature of an object with which said probe is contacted without thermally loading the object or erroneously reducing the temperature being measured, comprising:
    (a) a metal tip composed of a first metal and having thereon a first location at which said tip is in contact with said object and a second location at a predetermined distance from said first location, said first and second locations being in thermal communication via said tip:
    (b) a first lead composed of said first metal and having first and second ends, with said first end connected to said first location on said metal tip;
    (c) a second lead composed of a second metal and having first and second ends, with said first end thereof connected to said first end of said first lead and second end thereof terminating in a first output junction;
    (d) a third lead composed of said second metal having first and second ends, with said first end thereof connected to said second location on said metal tip and said second end thereof terminating in a second output junction;
    (e) electronic circuitry connected to said first and second output junctions for amplifying and displaying the temperature reading at said first location on said metal tip;
    (f) a heater at least a portion of which is intermediate said first and second locations on said metal tip, said heater being driven by said electronic circuitry when the temperature of said first location on said metal tip exceeds the temperature of said second location on said metal tip, thereby to prevent heat flow in said metal tip from said first loction thereon toward said second location thereon, said heat flow being characteristic of said unwanted loading; and
    (g) calibrating means for compensating for errors in the temperature measurements at said first and second locations on said metal tip, said calibrating means comprising a resistance temperature detector in close proximity to said first and second output junctions, said resistance temperature detector including a wire connected in series with said second end of said first lead and means for reducing the diameter of said wire by stretching.

5. A calibrated probe for measuring the temperature of an object with which said probe is contacted without thermally loading the object or erroneously reducing the temperature being measured, comprising:
    (a) a metal tip composed of a first metal and having thereon a first location at which said tip is in contact with said object and a second location at a predetermined distance from said first location, said first and second locations being in thermal communication via said tip;
    (b) a first lead composed of a second metal connected to said first location on said metal tip to form a first thermocouple junction;
    (c) a second lead composed of said second metal connected to said second lcoation on said metal tip to form a second thermocouple junction;
    (d) calibrating means for compensating for errors in the temperature measurements of said first and second thermocouples, said calibrating means comprising a single resistance temperature detector including a wire and means for reducing the diameter of said wire by stretching; and (e) a third lead composed of said first metal connected in series between said resistance temperature detector and said metal tip.

6. A calibrated probe for measuring the temperature of an object with which said probe is contacted without thermally loading the object or erroneously reducing the temperature being measured, comprising:
   (a) a metal tip composed of a first metal and having thereon a first location at which said tip is in contact with said object and a second location at a predetermined distance from said first location, said first and second locations being in thermal communication via said tip;
   (b) means for preventing heat flow in said metal tip from said first location toward said second location, said heat flow being characteristic of said unwanted loading, said means for preventing heat flow including:
      a first thermocouple for measuring the temperature at said first location on said metal tip;
      a second thermocouple for measuring the temperature at said second location on said metal tip; and
      heater means for maintaining said second location on said metal tip at substantially the same temperature as said first location on said metal tip, said heater comprising:
         a heater, at least a portion of which is intermediate said first and second locations on said metal tip; and
         a differential amplifier having first and second inputs responsive respectively to said first and second thermocouples and an output for driving said heater when the temperature at said first location on said metal tip exceeds the temperature at said second location on said metal tip;
      said first thermocouple comprises:
         a first lead composed of said first metal and having first and second ends, with said first end connected to said first location on said metal tip, and
         a second lead composed of a second metal and having first and second ends, with said first end thereof connected to said first end of said first lead and said second end thereof terminating in a first output junction connected to said first input of said differential amplifier; and
      said second thermocouple comprises a third lead composed of said second metal and having first and second ends, with said first end thereof connected to said second location on said metal tip and said second end thereof terminating in a second output junction connected to said second input of said differential amplifier; and
   (c) calibrating means for compensating for errors in the temperature readings of said first and second thermocouples, said calibrating means comprises a resistance temperature detector in close proximity to said first and second output junctions, said resistance temperature detector connected in series with said second end of said first lead, said resistance temperature detectors comprising a wire and means for reducing the diameter of said wire by stretching.

7. A calibrated probe as recited in claim 3, 4, 5 or 6, wherein said means for reducing the diameter of said wire by stretching comprises:
   a frame having a pair of generally parallel legs with a space therebetween; and
   a winding of said wire about said pair of legs such that said wire in said winding is stretched longitudinally when said space between said pair of legs is widened.

8. A calibrated probe, as recited in claim 3, 4, 5 or 6, wherein said wire is composed of nickel/iron.

* * * * *